United States Patent
Liu

(10) Patent No.: US 9,277,508 B2
(45) Date of Patent: Mar. 1, 2016

(54) METHOD, CONTROL APPARATUS AND COMMUNICATION SYSTEM FOR DYNAMICALLY ADJUSTING TRANSMIT POWER

(75) Inventor: Shui Liu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 889 days.

(21) Appl. No.: 13/486,827

(22) Filed: Jun. 1, 2012

(65) Prior Publication Data

US 2012/0238312 A1 Sep. 20, 2012

Related U.S. Application Data

(63) Continuation of application No. PCT/CN2010/077089, filed on Sep. 19, 2010.

(30) Foreign Application Priority Data

Dec. 3, 2009 (CN) .......................... 2009 1 0252142

(51) Int. Cl.
*H04W 52/22* (2009.01)
*H04W 52/24* (2009.01)
*H04B 1/525* (2015.01)

(52) U.S. Cl.
CPC .............. *H04W 52/245* (2013.01); *H04B 1/525* (2013.01); *H04W 52/244* (2013.01); *H04B 2215/00* (2013.01)

(58) Field of Classification Search
CPC . H04B 1/525; H04B 2215/00; H04W 52/244; H04W 52/245
See application file for complete search history.

(56) References Cited

U.S. PATENT DOCUMENTS 5,710,981 A 1/1998 Kim et al.
2002/0173331 A1 11/2002 Noh
(Continued)

FOREIGN PATENT DOCUMENTS

CN 1319282 A 10/2001
CN 1387320 A 12/2002
(Continued)

OTHER PUBLICATIONS

Office Action issued in corresponding European Patent Application No. 10 834 195.9; dated Jun. 7, 2013.
(Continued)

*Primary Examiner* — Fanghwa Wang
(74) *Attorney, Agent, or Firm* — Brinks Gilson & Lione

(57) ABSTRACT

A method for dynamically adjusting transmit power is disclosed, including: acquiring strength of a signal received by a receiver of a first system; determining whether the acquired strength is less than a sensitivity of the receiver corresponding to strength of a signal currently transmitted by a transmitter, based on correspondence information of strength of signals transmitted by the transmitter and sensitivities of the receiver, and the strength of the currently transmitted signal; if yes, then decreasing the strength of the currently transmitted signal to be equal to or less than the strength of a signal transmitted by the transmitter corresponding to a sensitivity of the receiver being regarded as the strength of the received signal. Corresponding control device and communication system are also provided. The manufacture cost of the device is reduced by the present invention. Meanwhile, better performance can be kept for the receiver.

6 Claims, 3 Drawing Sheets

(56) References Cited

U.S. PATENT DOCUMENTS

| | | | |
|---|---|---|---|
| 2009/0040937 A1 | 2/2009 | Xhafa et al. | |
| 2009/0176454 A1 | 7/2009 | Chen et al. | |
| 2011/0250881 A1* | 10/2011 | Michel et al. | 455/423 |

FOREIGN PATENT DOCUMENTS

| | | |
|---|---|---|
| CN | 1996786 A | 7/2007 |
| CN | 101018082 A | 8/2007 |
| CN | 201248142 Y | 5/2009 |
| CN | 101720124 A | 6/2010 |
| CN | 101720124 B | 5/2012 |
| EP | 1 838 040 A2 | 9/2007 |
| JP | 2009065307 A | 3/2009 |

OTHER PUBLICATIONS

International Search Report issued in corresponding PCT Patent Application No. PCT/CN2010/077089, mailed Dec. 30, 2010.
3GPP, "3$^{rd}$ Generation Partnership Project; Technical Specification Group Radio Access Networks; FDD Home NodeB RF Requirements Work Item Technical Report" (Release 8) 3GPP TR 25.967. 2.2.0, Feb. 2009.
Supplementary European Search Report issued in corresponding European Patent Application No. 10 83 4195; dated Jul. 10, 2012.
Zhu, Jing et al. "Multi-Radio Coexistence: Challenges and Opportunities" Computer Communications and Networks. Aug. 1, 2007:358-364.

* cited by examiner

METHOD, CONTROL APPARATUS AND COMMUNICATION SYSTEM FOR DYNAMICALLY ADJUSTING TRANSMIT POWER

CROSS-REFERENCE TO RELATED APPLICATIONS

This application is a continuation of International Application No. PCT/CN2010/077089, filed on Sep. 19, 2010, which claims priority to Chinese Patent Application No. 200910252142.6, filed on Dec. 3, 2009, both of which are hereby incorporated by reference in their entireties.

FIELD

The present invention generally relates to communication techniques, and more particularly, to a method, control device and communication system for dynamically adjusting transmit power.

BACKGROUND

With improvement of wireless communication techniques, a wireless device may have various components belonging to different wireless communication systems. For example, a wireless local network gateway product comprises a wireless access point (AP, Access Point) device and a station (Station) device, wherein the AP device is responsible for providing wireless access signal coverage within a certain area, and various terminal devices (for example, a computer, a cell phone, etc.) in the coverage of the AP device may access a network via the station device or the AP device.

Traditional AP devices access the Internet (INTERNET) on uplink via Ethernet or fiber optics in order to acquire enough bandwidth. However, with improvement of wireless techniques, High Speed Packages Access (HSPA, High Speed Packages Access) technique, Worldwide Interoperability for Microwave Access (WiMAX, Worldwide Interoperability for Microwave Access) or other wireless communication standards, instead of the Ethernet or fiber optics, have been used by the traditional AP devices (i.e., wireless gateway product) for uplink. Thus, the mobility and portability of the access points are greatly improved, which, however, directly results in simultaneous operating in a small space of both a wireless local area device communicating via Wireless Fidelity (WIFI, Wireless Fidelity) technique and other communication systems. Said other communication systems can be any one of Universal Mobile Telecommunications System (UMTS, Universal Mobile Telecommunications System), Global System for Mobile Communications (GSM, Global System for Mobile Communications), Code Division Multiple Access (CDMA, Code Division Multiple Access) system, Worldwide Interoperability for Microwave Access (WiMAX, Worldwide Interoperability for Microwave Access), Time Division-Synchronous Code Division Multiple Access (TD-SCDMA, Time Division-Synchronous Code Division Multiple Access) system, etc.

In those systems, in order to gain optimal coverage, the transmit power of the WIFI device is maintained to be highest all the time without control. Thus, the effect that a signal transmitted by the WIFI device brings into a signal received by terminals of other system must be taken into account when designing these terminals of other system. However, since the two communication systems co-exist in a small device, the isolation of the antennas between both systems is very low; and thus the other systems are easily blocked by high-power WIFI transmitting signals by the device. In order to prevent a sensitivity of the receiver from being degraded due to the blocking, the power of a WIFI transmitting signal arriving at the receiver must be restrained below a specific power.

In the prior art, a filter is added onto the receiving path of the other communication systems, or the restraint requirements of the filter on the frequency band of WIFI is enhanced.

During the study and practice on the prior art, the inventor of the present invention observes that: the enhancement of the restraint requirements of the WIFI filter on the first frequency band results in high difference loss within a normal receiving passband and thus results in deterioration of the system performance under normal conditions; meanwhile, the addition of the filter onto the receiving paths of the other communication systems or the enhancement of the restraint requirements of the filter results in the increase of the cost of the device.

SUMMARY

The present invention provides a method, control device and communication system for dynamically adjusting transmit power, which is intended to solve the problem of performance deterioration of receivers in other wireless communication systems due to high-power signals transmitted by a wireless communication system.

An embodiment of the present invention provides a method for dynamically adjusting transmit power, comprising:

acquiring strength of a signal received by a receiver of a first system;

determining whether the acquired strength of the signal received by the receiver of the first system is less than a sensitivity of the receiver of the first system corresponding to strength of a signal currently transmitted by a transmitter, according to correspondence information between strength of signals transmitted by the transmitter and sensitivities of the receiver of the first system, and the strength of the signal currently transmitted by the transmitter;

if yes, decreasing the strength of the signal currently transmitted by the transmitter to be equal to or less than strength of a signal transmitted by the transmitter corresponding to a sensitivity of the receiver of the first system which is regarded as the strength of the received signal.

An embodiment of the present invention further provides a control device for dynamically adjusting transmit power, comprising: an acquiring unit, a determining unit, and an adjusting unit.

the acquiring unit is configured to acquire strength of a signal received by a receiver of a first system;

the determining unit is configured to determine whether the acquired strength of the signal received by the receiver of the first system is less than a sensitivity of the receiver of the first system corresponding to strength of a signal currently transmitted by a transmitter, according to correspondence information between strength of signals transmitted by the transmitter and sensitivities of the receiver of the first system, and the strength of the signal currently transmitted by the transmitter; and the adjusting unit is configured to decrease the strength of the signal currently transmitted by the transmitter to be equal to or less than strength of a signal transmitted by the transmitter corresponding to a sensitivity of the receiver of the first system which is regarded as the strength of the received signal, when it is determined that the acquired strength of the signal received by the receiver of the first system is less than the sensitivity of the receiver of the first system corresponding to the strength of the signal currently transmitted by the transmitter.

An embodiment of the present invention further provides a communication system, comprising: a control device, a receiver of a first system and a transmitter:

the control device is configured to acquire strength of a signal received by the receiver of the first system; determine whether the acquired strength of the signal received by the receiver of the first system is less than a sensitivity of the receiver of the first system corresponding to strength of a signal currently transmitted by a transmitter, according to correspondence information between strength of signals transmitted by the transmitter and sensitivities of the receiver of the first system, and the strength of the signal currently transmitted by the transmitter; if yes, decrease the strength of the signal currently transmitted by the transmitter to be equal to or less than strength of a signal transmitted by the transmitter corresponding to a sensitivity of the receiver of the first system which is regarded as the strength of the received signal;

the receiver of the first system is configured to receive signals associated with the first system; and the transmitter is configured to transmit signals according to control of the control device.

The embodiments of the present invention implement as follows: determining whether the acquired strength of the signal received by the receiver of the first system is less than a sensitivity of the receiver of the first system corresponding to strength of a signal currently transmitted by a transmitter; and if yes, decreasing the strength of the signal transmitted by the transmitter, in order to reduce the interference with the received signal of the receiver of the first system from the signal transmitted by the transmitter, so that the receiver of the first system can demodulate the received signal. As compared with the prior art, since no filter is added into the receiver of the first system, the manufacture cost of the device is reduced. Meanwhile, better performance can be kept for the receiver of the first system.

BRIEF DESCRIPTION OF THE DRAWINGS

To more clearly illustrate the technical solutions of the present invention or the prior art, the drawings which are used to illustrate the embodiments or the prior art will be simply introduced. Obviously, the drawings in the following description are only some embodiments of the present invention. Persons skilled in the art can obtain other drawings based on these drawings without inventive work.

DETAILED DESCRIPTION

The technical solutions in the embodiments of the present invention are completely and clearly described below in conjunction with the drawings in the embodiments. It should be noted that these embodiments described below are only part embodiments of the present invention rather than all of the embodiments. All of other embodiments which can be acquired by persons skilled in the art without inventive work based on the embodiments of the present invention will fall into the scope of the present invention.

Embodiment One

Figure 1:
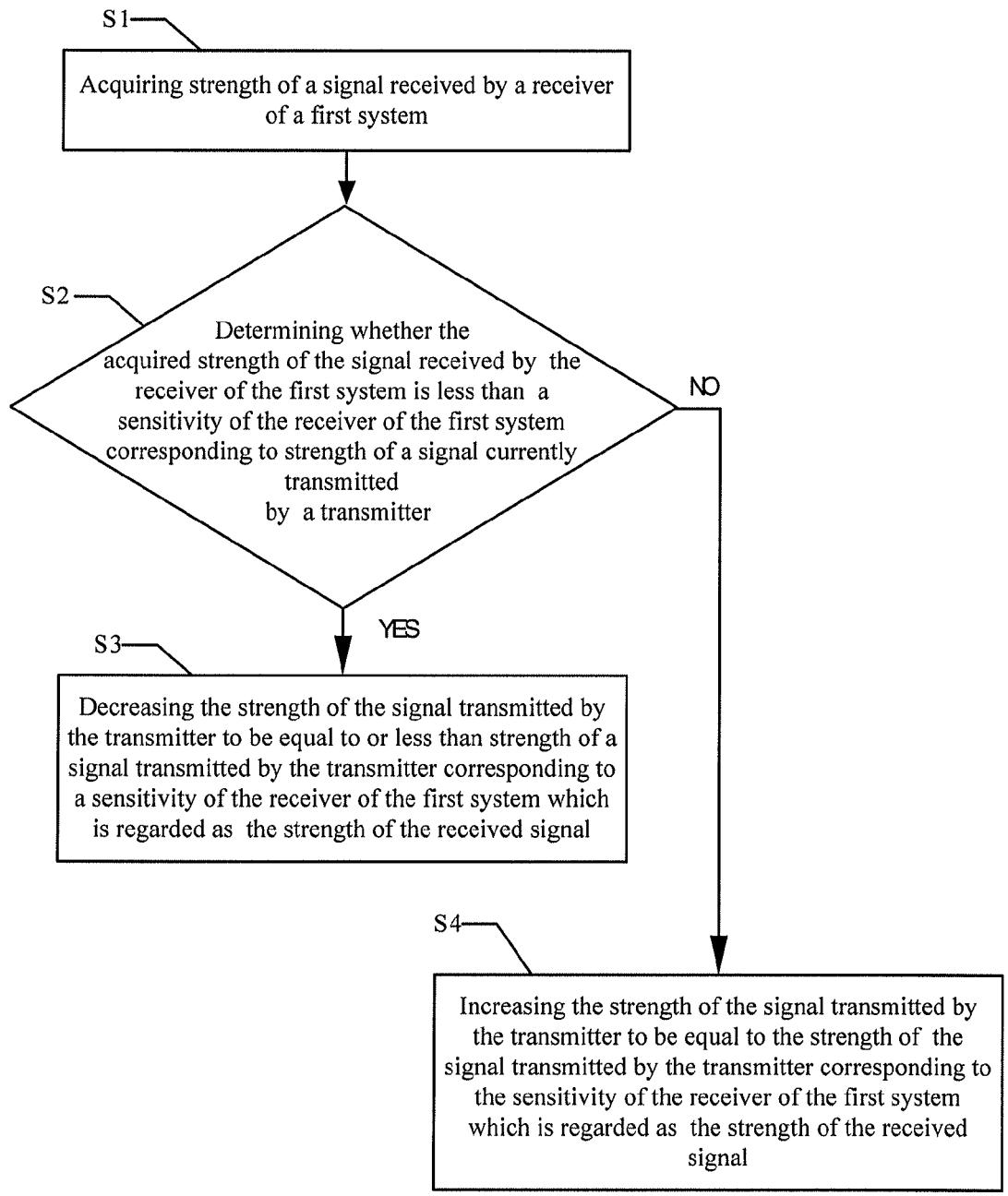
FIG. 1 is a flow diagram illustrating a method for dynamically adjusting transmit power provided by Embodiment One of the present invention.

The embodiment of the present invention provides a method of dynamically adjusting transmit power, as shown in FIG. 1. The method comprises:

Step S1: acquiring strength of a signal received by a receiver of a first system;

Wherein, the strength of the signal received by the receiver of the first system acquired at Step S1 may be detected by the device itself to get acquired, or alternatively, the strength of the signal received by the receiver of the first system may be detected by another device and then sent by the another device to the device for executing the method.

It is further required to be noted that, the above-mentioned first system may specifically be such a system that is subject to interference from high-power signals such as transmitted by a transmitter of a wireless local network access point (AP, Access Point) and is different from a wireless communication system which WIFI belongs to. Specifically, the first system can be anyone of the following systems: Universal Mobile Telecommunications System (UMTS, Universal Mobile Telecommunications System), Global System for Mobile Communications (GSM, Global System for Mobile Communications), Code Division Multiple Access (CDMA, Code Division Multiple Access) system, Worldwide Interoperability for Microwave Access (WiMAX, Worldwide Interoperability for Microwave Access) system, and Time Division-Synchronous Code Division Multiple Access (TD-SCDMA, Time Division-Synchronous Code Division Multiple Access) system, etc. The receiver of the first system may be a receiver used in the above-mentioned wireless communication systems or wireless communication techniques.

Step S2: determining whether the acquired strength of the signal received by the receiver of the first system is less than a sensitivity of the receiver of the first system corresponding to strength of a signal currently transmitted by a transmitter, according to correspondence information between strength of signals transmitted by the transmitter and sensitivities of the receiver of the first system, and the strength of the signal currently transmitted by the transmitter; if yes, performing Step S3;

Wherein, the correspondence information between the strength of the signals transmitted by the transmitter and the sensitivities of the receiver of the first system at Step S2 may specifically be in the form of a correspondence table stored in a device. Before performing the method provided by this embodiment, the device may measure the sensitivities of the receiver of the first system when the transmitter transmits signals with different strength, and then acquire the correspondence table based on the strength of the signals transmitted by the transmitter and the corresponding sensitivities of the receiver of the first system. Wherein, the above is only one of the operations for acquiring the correspondence table and should not be construed as limiting embodiments of the present invention. The correspondence table may also be acquired based on testing of another device and then sent to the device for performing the embodiments of the present invention so as to cause the device in the embodiments of the present invention to acquire the correspondence table.

It is further required to be noted that, the transmitter and the receiver of the first system at Step S2 may be co-located in one single device. Thus, the strength of the signal currently transmitted by the transmitter is known; based on the strength of the signal currently transmitted by the transmitter, it is easy to find out the sensitivity of the receiver of the first system corresponding to the strength of the signal currently transmitted by the transmitter. It is therefore determined whether the acquired strength of the signal received by the receiver of the first system is less than the sensitivity of the receiver of the first system corresponding to the strength of the signal currently transmitted by the transmitter. The above-mentioned transmitter can be a transmitter of the wireless local network access point, or a transmitter used in another wireless communication technique.

Step S3: decreasing the strength of the signal transmitted by the transmitter to be equal to or less than strength of a signal transmitted by the transmitter corresponding to a sensitivity of the receiver of the first system which is regarded as the strength of the received signal.

Wherein, it is required to be noted that, when it is determined at Step S2 that the acquired strength of the signal received by the receiver of the first system is less than the sensitivity of the receiver of the first system corresponding to the strength of the signal currently transmitted by the transmitter, it obviously indicates that the signal transmitted by the transmitter greatly interferes with the receiver of the first system, which already makes the signal received by the receiver of the first system be not correctly demodulated. Accordingly, the strength of the signal transmitted by the transmitter is decreased to be equal to or less than the strength of the signal transmitted by the transmitter corresponding to the sensitivity of the receiver of the first system which is regarded as the strength of the received signal.

As discussed above in Steps S1-S3, the method provided by the embodiment of the present invention implements as follows: determining whether the acquired strength of the signal received by the receiver of the first system is less than the sensitivity of the receiver of the first system corresponding to the strength of the signal currently transmitted by the transmitter; and if the determination is yes, decreasing the strength of the signal currently transmitted by the transmitter so as to reduce the interference with the received signal of the receiver of the first system from the signal transmitted by the transmitter, so that the receiver of the first system can demodulate the received signal. As compared with the prior art, no filter is added into the receiver of the first system and thus the manufacture cost of the device is reduced. Meanwhile, better performance can be kept in the receiver of the first system.

Furthermore, when the determination at the above-mentioned step S2 is positive, that is, when the acquired strength of the signal received by the receiver of the first system is greater than the sensitivity of the receiver of the first system corresponding to the strength of the signal currently transmitted by the transmitter, the method may further comprises:

Step S4: increasing the strength of the signal transmitted by the transmitter to be equal to the strength of the signal transmitted by the transmitter corresponding to the sensitivity of the receiver of the first system which is regarded as the strength of the received signal.

Wherein, by adding the above-mentioned Step S4, the receiver of the first system can demodulate the received signal while the signal transmitted by the transmitter can reach larger coverage, which enables the method to transmit and/or receive signals more reasonably.

Embodiment Two

The embodiment of the present invention provides a method of dynamically adjusting transmit power, which is similar to that in Embodiment One but a more specific application. Wherein, in this embodiment, the receiver of the first system as described in the above-mentioned Embodiment One is specifically referred as a receiver in any one of UMTS, GSM, CDMA, WiMAX, TD-SCDMA, etc. systems (Hereafter, the receiver of the GSM system is taken as an example for purpose of illustration. The operations of the receivers of other systems are similar as and thus can refer to the operation of the receiver of GSM system). The transmitter as described in the above-mentioned Embodiment One is specifically referred as a WIFI receiver in this embodiment.

Figure 2:
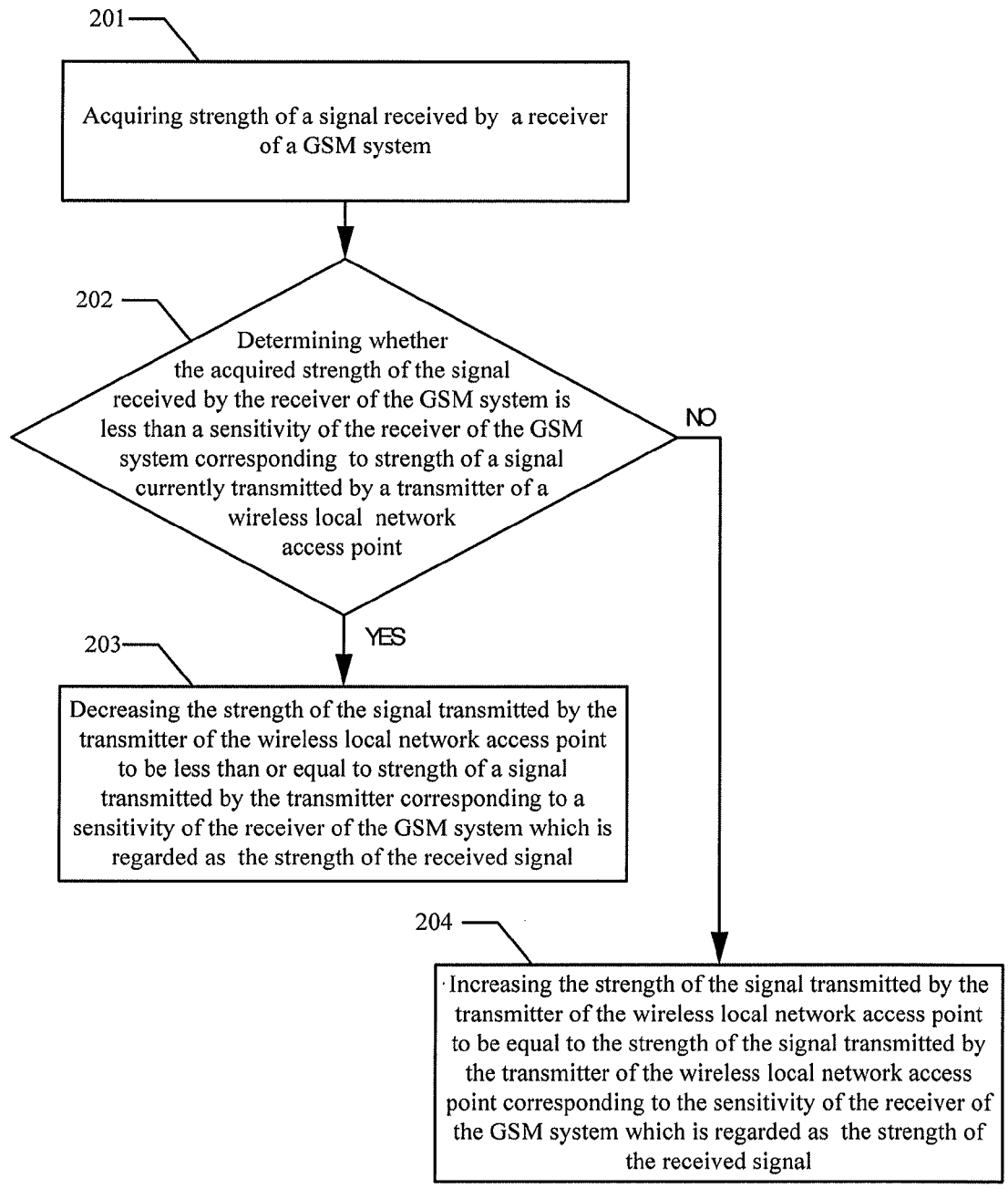
FIG. 2 is a flow diagram illustrating a method for dynamically adjusting transmit power provided by Embodiment Two of the present invention.

As shown in FIG. 2, the method comprises:

Step 201: acquiring strength of a signal received by the receiver of the GSM system;

Step 202: determining whether the acquired strength of the signal received by the receiver of the GSM system is less than a sensitivity of the receiver of the GSM system corresponding to strength of a signal currently transmitted by a transmitter of a wireless local network access point, according to correspondence information between strength of signals transmitted by the transmitter of the wireless local network access point and sensitivities of the receiver of the GSM system, and the strength of the signal currently transmitted by the transmitter of the wireless local network access point; if yes, performing Step 203.

Wherein, the correspondence information between the strength of the signals transmitted by the transmitter of the wireless local network access point and the sensitivities of the receiver of the GSM system as described at Step 202 can specifically be in the form of a correspondence table stored in a device. The correspondence table can specifically be acquired through testing performed by the device for implementing the method of the embodiment of the present invention. The correspondence table can also be acquired based on the testing performed by another device, and then sent to the device for performing the method so as to cause the device for performing the method to acquire the correspondence table. The following Table 1 is the correspondence table between the strength of signals transmitted by the transmitter of the wireless local network access point and the sensitivities of the receiver of the GSM system.

TABLE 1

| WIFI transmit power (dBm) | Sensitivities of the receiver of the GSM system (dBm) |
|---|---|
| 20 | −80 |
| 15 | −90 |
| 10 | −100 |
| <5 | −110 |

Wherein, the above values only represent a set of values in the correspondence table and are specifically acquired based on testing. Accordingly, the values in Table 1 should not be construed as limiting embodiments of the present invention. The specific values in Table 1 are different based on the different environments and testing conditions. It is only an example for purpose of facilitating understanding herein.

For example, when the strength of the received signal of the GSM receiver acquired at Step 201 is −88 dBm and the strength of the signal currently transmitted by the transmitter of the wireless local network access point is 20 dBm, the sensitivity of the receiver of the GSM system corresponding to the strength of the signal currently transmitted by the transmitter of the wireless local network access point is −80 dBm, and −88 dBm is smaller than −80 dBm. Accordingly, it is needed to perform Step 203 so as to decrease the transmit power of the transmitter of the wireless local network access point.

Step 203: decreasing the strength of the signal transmitted by the transmitter of the wireless local network access point to be equal to or less than strength of a signal transmitted by the transmitter corresponding to a sensitivity of the receiver of the GSM system which is regarded as the strength of the received signal.

It can be seen from the correspondence table as shown in Table 1 that, when the strength of the received signal of the GSM receiver is −88 dBm, the transmit power of the transmitter of the wireless local network access point is selected as 15 dBm. Thus, the GSM receiver can demodulate the received signal.

As discussed above in Steps 201-203, the method provided by the embodiment of the present invention implements as follows: determining whether the acquired strength of the signal received by the receiver of the GSM system is less than the sensitivity of the receiver of the GSM system corresponding to the strength of the signal currently transmitted by the transmitter of the wireless local network access point; and if the determination is positive, decreasing the strength of the signal transmitted by the transmitter of the wireless local network access point so as to reduce the interference with the received signal of the receiver of the GSM system from the signal transmitted by the transmitter of the wireless local network access point, so that the receiver of the GSM system can demodulate the received signal. As compared with the prior art, no filter is added into the receiver of the GSM system and thus the manufacture cost of the device is reduced. Meanwhile, better performance can be kept in the receiver of the GSM system.

Furthermore, for example, when the strength of the received signal of the GSM receiver acquired at Step 201 is −88 dBm and the strength of the signal transmitted by the transmitter of the wireless local network access point is 15 dBm, the sensitivity of the receiver of the GSM system corresponding to the strength of the signal currently transmitted by the transmitter of the wireless local network access point is −90 dBm, and −88 dBm is larger than −90 dBm. Accordingly, the transmit power of the transmitter of the wireless local network access point may be increased. Therefore, the method can further comprise:

Step 204: increasing the strength of the signal transmitted by the transmitter of the wireless local network access point to be equal to the strength of the signal transmitted by the transmitter of the wireless local network access point corresponding to the sensitivity of the receiver of the GSM system which is regarded as the strength of the received signal.

To be illustrated, the above-mentioned Step 204 may be understood as increasing the transmit power of the signal transmitted by the transmitter of the wireless local network access point to such a transmit power of the transmitter of the wireless local network access point that corresponds to the sensitivity of the receiver of the GSM system of −88 dBm. Since the transmit power of the transmitter of the wireless local network access point corresponding to the sensitivity of the GSM receiver of −88 dBm is not tested in Table 1, designers may select whether to measure the transmit power of the transmitter of the wireless local network access point corresponding to the sensitivity of the GSM receiver of −88 dBm based on practical need.

To be further illustrated, when there is no transmit power of the transmitter of the wireless local network access point corresponding to the sensitivity of the GSM receiver of −88 dBm in Table 1, the transmitter of the wireless local network access point can maintain the transmit power of the currently transmitted signal.

Wherein, by adding the above-mentioned Step 204, the receiver of the GSM system can demodulate the received signal while the signal transmitted by the transmitter of the wireless local network access point can reach larger coverage, which enables the method to transmit and/or receive signals more reasonably.

Embodiment Three

Figure 3:
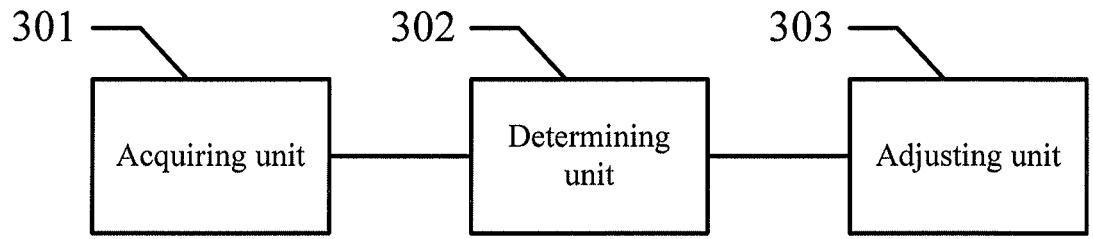
FIG. 3 is logic unit diagram illustrating a control device provided by Embodiment Three of the present invention.

The embodiment of the present invention provides a control device, as shown in FIG. 3. The control device comprises: an acquiring unit 301, a determining unit 302 and an adjusting unit 303.

Wherein, the acquiring unit 301 is configured to acquire strength of a signal received by a receiver of a first system.

To be illustrated, the strength of the signal received by the receiver of the first system acquired by the acquiring unit 301 may be detected by the device itself to get acquired, or alternatively, may be detected by the receiver of the first system and then sent to the acquiring unit 301.

The determining unit 302 is configured to determine whether the acquired strength of the signal received by the receiver of the first system is less than a sensitivity of the receiver of the first system corresponding to strength of a signal currently transmitted by a transmitter, according to correspondence information between strength of signals transmitted by the transmitter and sensitivities of the receiver of the first system, and the strength of the signal currently transmitted by the transmitter.

Wherein, the correspondence information between the strength of the signals transmitted by the transmitter and the sensitivities of the receiver of the first system can specifically be in the form of a correspondence table stored in a device. Before performing the method provided by this embodiment, the device can measure sensitivities of the receiver of the first system when the transmitter transmits signals with different strength, and then acquire the correspondence table based on the strength of the signals transmitted by the transmitter and the corresponding sensitivities of the receiver of the first system. Wherein, the above is only one of the operations for acquiring the correspondence table and should not be construed as limiting embodiments of the present invention. The correspondence table can also be acquired based on testing of another device and then be sent to the device for performing the embodiments of the present invention so as to cause the device in the embodiments of the present invention to acquire the correspondence table.

To be further appreciated, the above-mentioned transmitter may be a transmitter of a wireless local network access point. The above-mentioned receiver of the first system can specifically be any one of GSM, CDMA, WIMAX, TD-SCDMA, and UMTS system receivers.

The adjusting unit 303 is configured to: decrease the strength of the signal transmitted by the transmitter to be equal to or less than strength of a signal transmitted by the transmitter corresponding to a sensitivity of the receiver of the first system which is regarded as the strength of the received signal, when it is determined in the determining unit 302 that the acquired strength of the signal received by the receiver of the first system is less than the sensitivity of the receiver of the first system corresponding to the strength of the signal currently transmitted by the transmitter.

Wherein, to be illustrated, when it is determined in the determining unit 302 that the acquired strength of the signal received by the receiver of the first system is less than the sensitivity of the receiver of the first system corresponding to the strength of the signal currently transmitted by a transmitter, it obviously indicates that the signal transmitted by the transmitter greatly interferes with the receiver of the first system, which makes the received signal be not correctly demodulated by the receiver of the first system. Accordingly, the strength of the signal transmitted by the transmitter is decreased to be equal to or less than strength of a signal transmitted by the transmitter corresponding to the sensitivity of the receiver of the first system which is regarded as the strength of the received signal.

As discussed above regarding the control device provided in the embodiment of the present invention, the device implements as follows: determining whether the acquired strength of the signal received by the receiver of the first system is less than the sensitivity of the receiver of the first system corresponding to the strength of the signal currently transmitted by the transmitter; and if the determination is yes, decreasing the strength of the signal transmitted by the transmitter so as to reduce the interference with the received signal of the receiver of the first system from the signal transmitted by the transmitter, so that the receiver of the first system can demodulate the received signal. As compared with the prior art, no filter is added into the receiver of the first system and thus the manufacture cost of the device is reduced. Meanwhile, better performance can be kept in the receiver of the first system.

The adjustment unit 303 is further configured to increase the strength of the signal transmitted by the transmitter to be equal to the strength of the signal transmitted by the transmitter corresponding to the sensitivity of the receiver of the first system which is regarded as the strength of the received signal, when it is determined in the determining unit 302 that the acquired strength of the signal received by the receiver of the first system is greater than the sensitivity of the receiver of the first system corresponding to the strength of the signal currently transmitted by the transmitter.

Since the adjusting unit 303 can be further configured to increase the transmit power of the transmitted signal, the receiver of the first system can demodulate the received signal while the signal transmitted by the transmitter can reach larger coverage. Thus, the control device can control the transmitter to transmit signals and the receiver of the first system to receive signals more reasonably.

Embodiment Four

Figure 4:
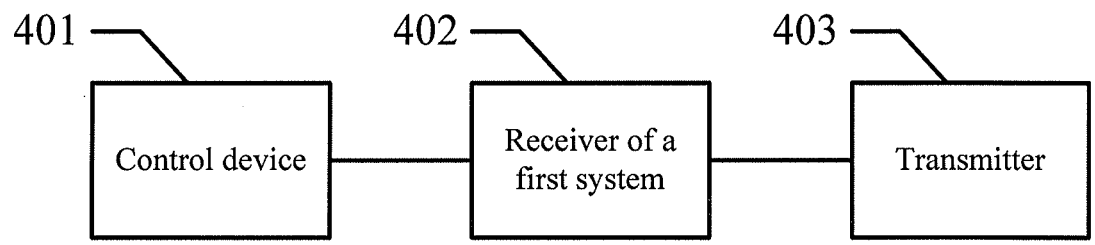
FIG. 4 is a schematic diagram illustrating a communication system provided by Embodiment 4 of the present invention.

The embodiment of the present invention provides a communication system, as shown in FIG. 4. The communication system comprises a control device 401, a receiver of a first system 402 and a transmitter 403.

Wherein, the control device 401 is configured to acquire strength of a signal received by a receiver of a first system; to determine whether the acquired strength of the signal received by the receiver of the first system is less than a sensitivity of the receiver of the first system corresponding to strength of a signal currently transmitted by a transmitter, according to correspondence information between strength of signals transmitted by the transmitter and sensitivities of the receiver of the first system, and the strength of the signal currently transmitted by the transmitter; and to decrease the strength of the signal transmitted by the transmitter to be equal to or less than strength of a signal transmitted by the transmitter corresponding to a sensitivity of the receiver of the first system which is regarded as the strength of the received signal, when it is determined that the acquired strength of the signal received by the receiver of the first system is less than the sensitivity of the receiver of the first system corresponding to the strength of the signal currently transmitted by the transmitter.

The receiver of the first system 402 is configured to receive signals associated with the first system.

Wherein, the above-mentioned receiver of the first system 402 can specifically be any one of GSM, CDMA, WIMAX, TD-SCDMA, and UMTS system receivers.

The transmitter 402 is configured to transmit signals according to control of the control device.

Wherein, the above-mentioned transmitter can specifically be a transmitter of a wireless local network (WIFI).

As discussed above regarding the communication system provided in the embodiment of the present invention, the system implements as follows: determining whether the acquired strength of the signal received by the receiver of the first system is less than the sensitivity of the receiver of the first system corresponding to the strength of the signal currently transmitted by the transmitter; and if the determination is yes, decreasing the strength of the signal currently transmitted by the transmitter so as to reduce the interference with the received signal of the receiver of the first system from the signal transmitted by the transmitter, so that the receiver of the first system can demodulate the received signal. As compared with the prior art, no filter is added into the receiver of the first system and thus the manufacture cost of the device is reduced. Meanwhile, better performance can be kept in the receiver of the first system.

The control device 401 of the communication system is further configured to increase the strength of the transmitted signal of the transmitter to be equal to the strength of the signal transmitted by the transmitter corresponding to the sensitivity of the receiver of the first system which is regarded as the strength of the received signal, when it is determined that the acquired strength of the signal received by the receiver of the first system is greater than the sensitivity of the receiver of the first system corresponding to the strength of the signal currently transmitted by the transmitter.

Since the transmitter can be further configured to increase the transmit power of the transmitted signal based on the control of the control device 401, the receiver of the first system can demodulate the received signal while the signal transmitted by the transmitter can reach larger coverage. Thus, the control device can control the transmitter to transmit signals and the receiver of the first system to receive signals more reasonably.

Persons skilled in the art can understand that, all or part of the steps of various methods in the above-mentioned embodiments can be implemented by the program which instructs the hardware. The program can be stored in a computer-readable media, which comprises ROM, RAM, disc or optic, etc.

The method, control device and communication system for dynamically adjusting transmit power are illustrated in embodiments of the present invention in detail. The principle and the embodiments of the present invention are set forth by using the specific examples. The above discussion is only used to facilitate to understand the method or core concept of the present invention. In addition, persons ordinary in the art can make any change to the embodiments and application fields based on the concept of the present invention. In conclusion, the above contents of the description should not be construed to limiting the present invention.

What is claimed is:

1. A method for dynamically adjusting transmit power, comprising:
   acquiring a first strength of a first signal received by a receiver of a first system;

acquiring a second strength of a signal transmitted by a transmitter of a second system;

acquiring a sensitivity of the receiver of the first system corresponding to the second strength of a signal currently transmitted by the transmitter, according to correspondence information between strengths of signals transmitted by the transmitter and sensitivities of the receiver of the first system;

when the first strength of the first signal is less than the sensitivity of the receiver of the first system, decreasing the second strength of the signal currently transmitted by the transmitter to be a third strength;

wherein the third strength is equal to or less than strength of a signal transmitted by the transmitter corresponding to a sensitivity of the receiver of the first system which is regarded as the first strength of the received first signal;

wherein the correspondence information comprises correspondence information between strengths of signals transmitted by the transmitter and sensitivities of the receiver of the first system when the transmitter transmits signals with different strengths; and wherein the transmitter is a transmitter of a wireless local network access point, and the first system is any system of the Universal Mobile Telecommunications System, Global System for Mobile Communications, Code Division Multiple Access system, Worldwide Interoperability for Microwave Access system and Time Division-Synchronous Code Division Multiple Access system.

2. The method for dynamically adjusting transmit power of claim 1, further comprising:

increasing the second strength of the signal currently transmitted by the transmitter to be equal to the strength of the signal transmitted by the transmitter corresponding to the sensitivity of the receiver of the first system which is regarded as the first strength of the received first signal, when the acquired first strength of the first signal received by the receiver of the first system is greater than the sensitivity of the receiver of the first system corresponding to the second strength of the signal currently transmitted by the transmitter.

3. A control device, comprising: an acquiring unit, a determining unit, and an adjusting unit; wherein the acquiring unit is configured to acquire a first strength of a first signal received by a receiver of a first system;

the determining unit is configured to determine whether the acquired first strength of the first signal received by the receiver of the first system is less than a sensitivity of the receiver of the first system corresponding to a second strength of a signal currently transmitted by a transmitter of a second system, according to correspondence information between strengths of signals transmitted by the transmitter and sensitivities of the receiver of the first system, and the second strength of the signal currently transmitted by the transmitter; and the adjusting unit is configured to decrease the second strength of the signal currently transmitted by the transmitter to be a third strength, when the first strength of the first signal is less than the sensitivity of the receiver of the first system:

wherein the third strength is equal to or less than strength of a signal transmitted by the transmitter corresponding to a sensitivity of the receiver of the first system which is regarded as the first strength of the received first signal;

wherein the correspondence information comprises correspondence information between strengths of signals transmitted by the transmitter and sensitivities of the receiver of the first system when the transmitter transmits signals with different strengths; and wherein the transmitter is a transmitter of a wireless local network access point, and the first system is any system of the Universal Mobile Telecommunications System, Global System for Mobile Communications, Code Division Multiple Access system, Worldwide Interoperability for Microwave Access system and Time Division-Synchronous Code Division Multiple Access system.

4. The device of claim 3, wherein the adjustment unit is further configured to increase the second strength of the signal currently transmitted by the transmitter to be equal to the strength of the signal transmitted by the transmitter corresponding to the sensitivity of the receiver of the first system which is regarded as the first strength of the received first signal, when it is determined that the acquired first strength of the first signal received by the receiver of the first system is greater than the sensitivity of the receiver of the first system corresponding to the second strength of the signal currently transmitted by the transmitter.

5. A communication system, comprising:

a control device is configured to acquire a first strength of a first signal received by a receiver of a first system; to determine whether the acquired first strength is less than a sensitivity of the receiver of the first system corresponding to a second strength of a signal currently transmitted by a transmitter of a second system, according to correspondence information between strengths of signals transmitted by the transmitter and sensitivities of the receiver of the first system, and the second strength of the signal currently transmitted by the transmitter; and when yes, to decrease the second strength of the signal currently transmitted by the transmitter to be a third strength;

wherein the third strength is equal to or less than strength of a signal transmitted by the transmitter corresponding to a sensitivity of the receiver of the first system which is regarded as the first strength of the received first signal; and wherein the correspondence information comprises correspondence information between strengths of signals transmitted by the transmitter and sensitivities of the receiver of the first system when the transmitter transmits signals with different strengths;

the receiver of the first system is configured to receive signals associated with the first system;

the transmitter is configured to transmit signals according to control of the control device; and wherein the transmitter is a transmitter of a wireless local network access point, and the first system is any system of the Universal Mobile Telecommunications System, Global System for Mobile Communications, Code Division Multiple Access system, Worldwide Interoperability for Microwave Access system and Time Division-Synchronous Code Division Multiple Access system.

6. The communication system of claim 5, wherein the control device is further configured to increase the second strength of the signal currently transmitted by the transmitter to be equal to the strength of the signal transmitted by the transmitter corresponding to the sensitivity of the receiver of the first system which is regarded as the first strength of the received first signal, when it is determined that the acquired first strength of the first signal received by the receiver of the first system is greater than the sensitivity of the receiver of the first system corresponding to the second strength of the signal currently transmitted by the transmitter.

* * * * *